United States Patent [19]
Maruyama

[11] Patent Number: 5,724,382
[45] Date of Patent: Mar. 3, 1998

[54] MULTIMODE SPREAD SPECTRUM COMMUNICATION SYSTEM TOLERANT TO VARYING CHANNEL CHARACTERISTICS

[75] Inventor: Hidenori Maruyama, Tokyo, Japan

[73] Assignee: NEC Corporation, Japan

[21] Appl. No.: 593,606

[22] Filed: Jan. 30, 1996

[30] Foreign Application Priority Data

Jan. 30, 1995 [JP] Japan .................. 7-012267

[51] Int. Cl.$^6$ .................. H04B 1/707
[52] U.S. Cl. .................. 375/206
[58] Field of Search .................. 375/200, 206

[56] References Cited

U.S. PATENT DOCUMENTS

| | | | |
|---|---|---|---|
| 4,672,658 | 6/1987 | Kavehrad et al. | 455/555 |
| 5,063,571 | 11/1991 | Vancraeynest | 375/200 |
| 5,291,515 | 3/1994 | Uchida et al. | 375/200 |
| 5,515,396 | 5/1996 | Dalekotzin | 375/206 |
| 5,583,884 | 12/1996 | Maruyama et al. | 375/207 |
| 5,625,639 | 4/1997 | Tomita et al. | 375/200 |

FOREIGN PATENT DOCUMENTS 3-283743  12/1991  Japan .

Primary Examiner—Stephen Chin
Assistant Examiner—Jeffrey W. Gluck
Attorney, Agent, or Firm—Ostrolenk, Faber, Gerb & Soffen, LLP

[57] ABSTRACT

At a transmit site of a spread spectrum communication system, a header is produced containing integers M and N (where $M>1$ and $N \geq 0$) and a frame is assembled with symbol bits. The header is converted to I and Q signals having a predetermined number of signal points in a signal constellation, which are spread with a predetermined pseudorandom sequence, and quadrature-modulated and transmitted. Using integers M and N, (M+N) data bits in a symbol are separated into M- and N-bit portions. The M-bit portion of each symbol is converted to I and Q signals having $2^M$ signal points in the signal constellation, which are spread with one of $2^N$ pseudorandom sequences according to the N-bit portion of each symbol, quadrature-modulated and transmitted. At a receive site, the transmitted header is converted to I and Q signals which are despread with the predetermined PN sequence to detect the integers M and N. The transmitted frame is converted to I and Q signals, which are sequentially despread with $2^N$ PN sequences determined by the detected integer N, and then stored in a memory. Correlations between the I and Q signals of the frame and the $2^N$ PN sequences are detected and a maximum correlation is identified for each symbol. A modulo-$2^N$ count is incremented in response to each correlation to produce a series of modulo-$2^N$ counts, and one of which is selected that corresponds to the maximum correlation. N-bit data representing the selected count is produced to read I and Q signals from the memory. The read I and Q signals are converted to M-bit data using integer M, and the M- and N-bit data are converted to a serial form.

18 Claims, 2 Drawing Sheets

MULTIMODE SPREAD SPECTRUM COMMUNICATION SYSTEM TOLERANT TO VARYING CHANNEL CHARACTERISTICS

BACKGROUND OF THE INVENTION

1. Field of the Invention

The present invention relates generally to spread spectrum communication, and more specifically to a spread spectrum communication technique particularly useful for application to local area networks as a means of radio communication between data terminals.

2. Description of the Related Art

A number of multiple mode radio communication systems have been proposed to accommodate varying characteristics of radio channels. Japanese Provisional Patent Publication Hei-3-283743 discloses a multimode modulator that varies its number of signal points in the signal constellation (phasor diagram) according to the severity of channel characteristics. Under favorable conditions, the modulator is switched to 16 QAM (quadrature amplitude modulation) mode to increase the transmission speed and switched to 2 PSK (plastic shift keying) mode to decrease its speed when the system encounters worst conditions.

As radio transmission links of local area networks, use is recently made of spread spectrum technique to benefit from its tolerance to noise and interference. However, with the increasing number of radio LANs, instances of unfavorable channel conditions increase due to interference. Therefore, it is desired to improve the performance of spread spectrum communication systems operating under unfavorable conditions.

SUMMARY OF THE INVENTION

It is therefore an object of the present invention to provide a multimode spread spectrum communication system and method that can be used under unfavorable conditions of radio channels.

According to a first aspect of the present invention there is provided a spread spectrum transmitter which comprises framing means for producing a header containing an integer M, and assembling symbol bits to form a frame, where M is equal to or greater than 1. Separator means is provided for separating (M+N) data bits of a symbol in the frame into an M-bit portion of an N-bit portion, where N is equal to or greater than 0. A quadrature mapping circuit is connected to receive the header and the M-bit portion of the symbol from the separator means for converting the header into in-phase (I) and quadrature (Q) signals having a predetermined number of signal points in a signal constellation and converting the M-bit portion of the symbol into I and Q signals having $2^M$ signal points in the signal constellation. The I and Q signals of the header are spread with a predetermined pseudorandom sequence and the I and Q signals of the frame are spread with one of $2^N$ pseudorandom sequences of unique bit patterns according to the N-bit portion of each symbol in the frame. The spread signals of both header and frame are quadrature modulated and transmitted.

According to a second aspect of the present invention, there is provided a spread spectrum receiver that comprises receiver means for receiving quadrature-modulated spread spectrum signals containing a header having an integer M and a frame having symbol bits, and converting the header and the frame to I and Q signals. Pseudorandom sequence generator means produces a predetermined pseudorandom sequence when the header is being received and sequentially produces $2^N$ pseudorandom sequences of unique bit patters when the frame is being received. The I and Q signals of the header are despread with the predetermined pseudorandom sequence and the I and Q signals of the frame are despread with the sequentially produced $2^N$ pseudorandom sequences. The integer M contained in the transmitted header is detected from the despread header. Maximum detector means receives the despread I and Q signals from the despreading means for detecting correlations between the I and Q signals of the frame and the $2^N$ pseudorandom sequences and detecting a maximum value of the correlations for each symbol. A modulo-$2^N$ counter means is provided for incrementing a modulo-$2^N$ count value in response to each of the correlations to produce a series of modulo-$2^N$ count values. The counter means causes the pseudorandom sequence generator means to produce the $2^N$ pseudorandom sequences according to the modulo-$2^N$ count values, and selects one of the count values corresponding to the correlation having the maximum value to produce N-bit data representing the selected count value. A memory is provided for storing the despread I and Q signals of each symbol and reading stored I and Q signals identified by the N-bit data. An inverse quadrature mapping circuit converts the I and Q signals read out of the memory into M-bit data using the integer M. The M- and N-bit data are then combined into a serial form.

Preferably, the integer N may be variable on a frame-by-frame basis. In this case, the transmitted header additionally contains an integer N, and the receiver uses a programmable counter which is preset to the transmitted integer N to produce $2^N$ pseudorandom sequences.

BRIEF DESCRIPTION OF THE DRAWINGS

The present invention will be described in further detail with reference to the accompanying drawings, in which.

DETAILED DESCRIPTION

Figure 1:
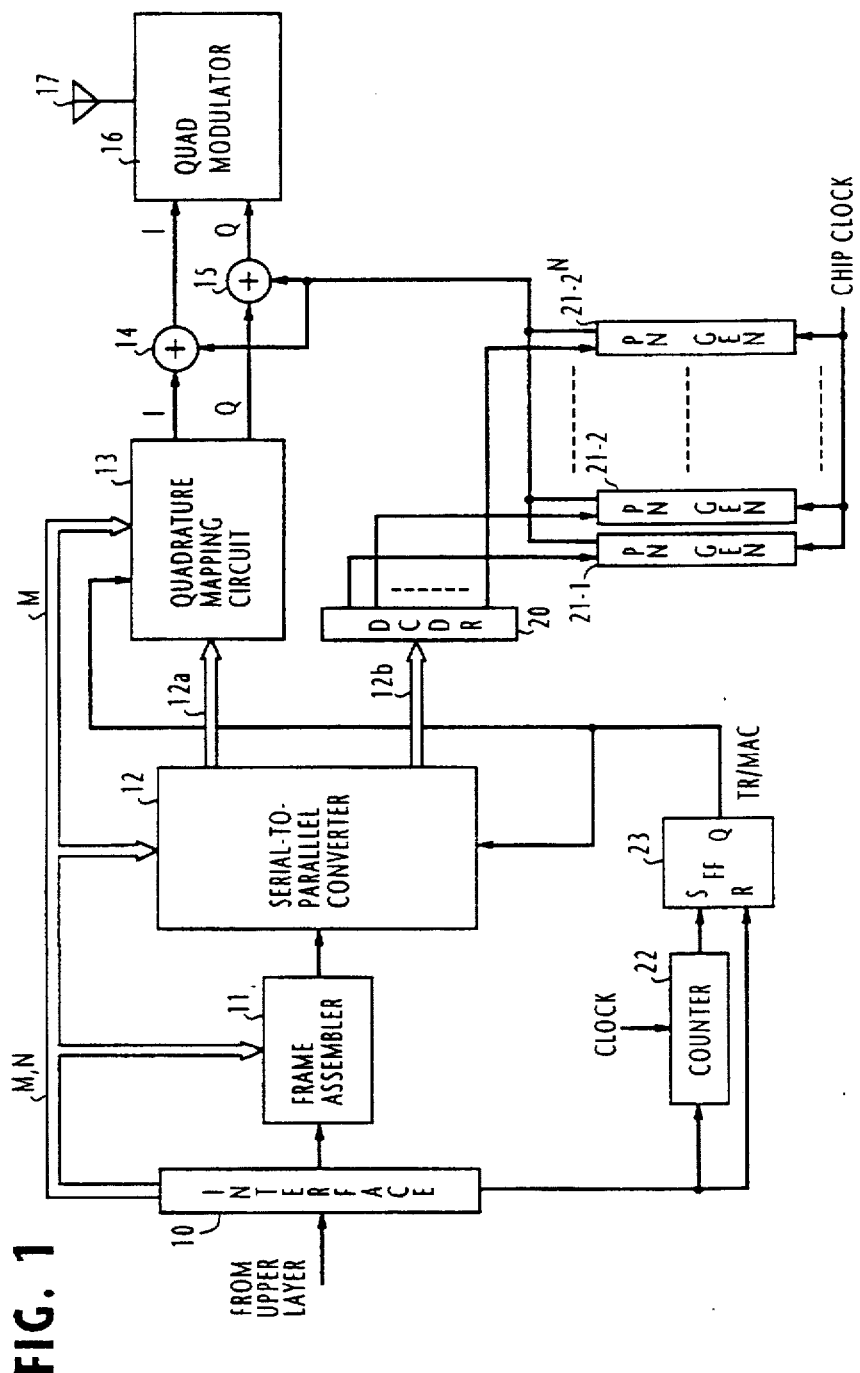
FIG. 1 is a block diagram of a variable mode spread spectrum transmitter for a local area network according to the present invention.
Figure 2:
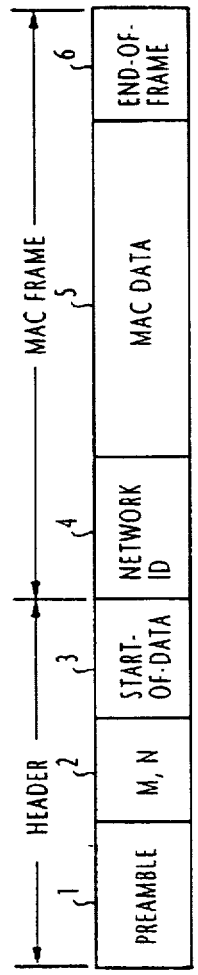
FIG. 2 is an illustration of a frame format used in the network.

In FIG. 1, there is shown a spread spectrum transmitter for use in a local area network, particularly for the media access (MAC) layer of the local area network. The transmitter has an interface 10 for interfacing an upper layer of the local area network and a frame assembler 11 connected thereto for producing a header and assembling symbol bits to form a MAC frame. As shown in FIG. 2, the header contains a preamble or training sequence 1 for pre-conditioning the network for data transmission, a mode indicating field 2 and a start-of-data 3. The MAC frame contains a network identifier 4, a MAC data field 5 and an end-of-frame flag 6. The mode indicating field 2 contains integers M and N, where M indicates the number of symbol bits to be modulated onto quadrature carriers, and where N represents the N-th power of "2" to indicate the number of pseudorandom sequences (i.e., $2^N$ sequences) to be repeatedly used during a frame to "spread" its symbol bits at a chip rate. The integer M is equal to or greater than 1 and the integer N is equal to or greater than 0. Note that the integer N set in the mode indicating field 2 remains unchanged during the transmission of a frame. As will be described, the integer N is used at a receive site to identify those PN sequences to be sequentially used to "despread" each symbol to detect cross-correlations between it and the PN sequences in order to determine which one of such sequences was actually used at the transmit site. More specifically, the integer N is used to preset a programmable counter provided in the receive site to produce a count that identifies a PN sequence.

The output of the frame assembler 11 is applied in serial form to a serial-to-parallel converter 12 having output bus 12a and 12b. Converter 12 is responsive to integers M and N supplied from the upper layer via the interface 10 for separating (M+N) serial data bits of a symbol in the frame into M- and N-bit parallel codes. When the header is to be transmitted, integers M and N are respectively set to 1 and 0 and serial-to-parallel converter 12 leaves the data bits of each symbol in the header in serial form and forwards them to the output bus 12a, and sets the output bus 12b to all zeros.

The output bus 12a of converter 12 is connected to a quadrature mapping circuit 13 where the M-bit parallel code converted to a pair of digital sine and cosine values in serial form which assumes a pair of particular signal points in a phasor diagram, or signal constellation. The mapping circuit 13 performs this mapping operating using a mode command integer M supplied from interface 10 so that the signal points occupy predetermined positions of a $2^M$-ary signal constellation.

When a header is to be transmitted, the integer M is set to 1 and the outputs of the mapping circuit 13 assume one of two angular positions in a 2 PSK phasor diagram, and the system operates in a 2 PSK mode. When a frame is to be transmitted, on the other hand, the integer M is set to a value in the range from 1 to a predetermined maximum value. If M=2, for example, the outputs of the mapping circuit 13 assume one of four angular positions in a 4 PSK phasor diagram, and the system operates in a 4 PSK mode.

The sine and cosine values of the mapping circuit 13 are supplied as in-phase (I) and quadrature (Q) channel signals to modulo-2 adders, or exclusive-OR gates 14 and 15, respectively. As will be described, the I and Q signals are spread by pseudorandom (PN) sequences supplied to the modulo-2 adders 14, 15. The outputs of the modulo-2 adders 14, 15 are coupled to a radio-frequency quadrature modulator 16 where the spread I and Q signals of both header and frame are multiplied respectively by radio-frequency quadrature carriers to produce a pair of amplitude-modulated signals which are combined together to produce a constant envelope, phase-shift keyed signal and transmitted from antenna 17.

The output bus 12b of serial-to-parallel converter 12 is connected to a decoder 20 having $2^N$ output leads, where the N-bit parallel code is decoded to activate one of the $2^N$ output leads. The outputs of decoder 20 are coupled respectively to PN sequence generators 21-1 through 21-$2^N$. The integer N identifies a predetermined set of the $2^N$ pseudorandom sequence generators 20. Since the N-bit parallel code from serial-to-parallel converter 12 varies with the symbol data, one of the identified pseudorandom sequence generators 21 is activated and a pseudorandom sequence from the activated PN sequence generator is supplied to the modulo-2 adders 14 and 15. When the N-bit parallel code is all zeros, the decoder 20 exclusively activates the PN sequence generator 21-1.

A counter 22 and a flip-flop 23 are connected to interface 10. Flip-flop 23 is reset by interface 10 to cause its Q output to switch to low, signaling the start of a header. Simultaneously, counter 22 is activated to start counting system clock. When counter 22 attains a predetermined value, the time has progressed to the start timing of a MAC frame and the counter 22 causes flip-flop 23 to set in a high output state. The output of flip-flop 23, designated as TR/MAC, is low when a header is being transmitted and high when a MAC frame is being transmitted. When the header is transmitted, the training sequence contained in the preamble 1 of the header causes a receiver to synchronize to the transmitter timing and to condition the receiver in a state specified by the integers M and N contained in the mode indicating field 2 of the header. The output of flip-flop 23 is coupled to the serial-to-parallel converter 12 and quadrature mapping circuit 13 to set them in the initial training mode when TR/MAC is low. Specifically, when TR/MAC is low, the serial-to-parallel converter 12 is set to apply all "0"s to its output leads 12b and decoder 20 exclusively activates PN generator 21-1, and the quadrature mapping circuit 13 is set to a predetermined PSK mode, e.g., 2 PSK mode. Therefore, the header information is scrambled by the PN generator 21-1 and transmitted to the 2 PSK mode.

When the output of flip-flop 23 goes high, serial-to-parallel converter 12 and mapping circuit 13 are set in a particular transmission mode as specified by the command signals from interface 10. During the transmission of a given MAC frame, symbol bits in that frame from frame assembler 11 are separated by serial-to-parallel converter 12 into M- and N-bit parallel codes. If M=2 and N=1, three data bits per symbol are transmitted during the frame. In this case, the mapping circuit 13 is set in a 4 PSK mode and the 1-bit N code is converted by decoder 20 to selectively activate PN generator 21-1 or 21-2 depending on whether the 1-bit N code is "0" or "1". Thus, the outputs of mapping circuit 13 produced for integer M=2 are spread by a PN sequence from either PN generator 21-1 or 21-2 on a per symbol basis. A spread spectrum 4 PSK signal is then transmitted from antenna 19 to a receiver which is shown in FIG. 3.

If the quality of radio propagation has degraded, the upper layer processor will become aware of this and will change the transmission parameters M and N so that the number of bits per symbol is decreased to lower the transmission speed. If the situation becomes favorable for data transmission, the transmission speed may be increased by increasing the number of bits per symbol.

Figure 3:
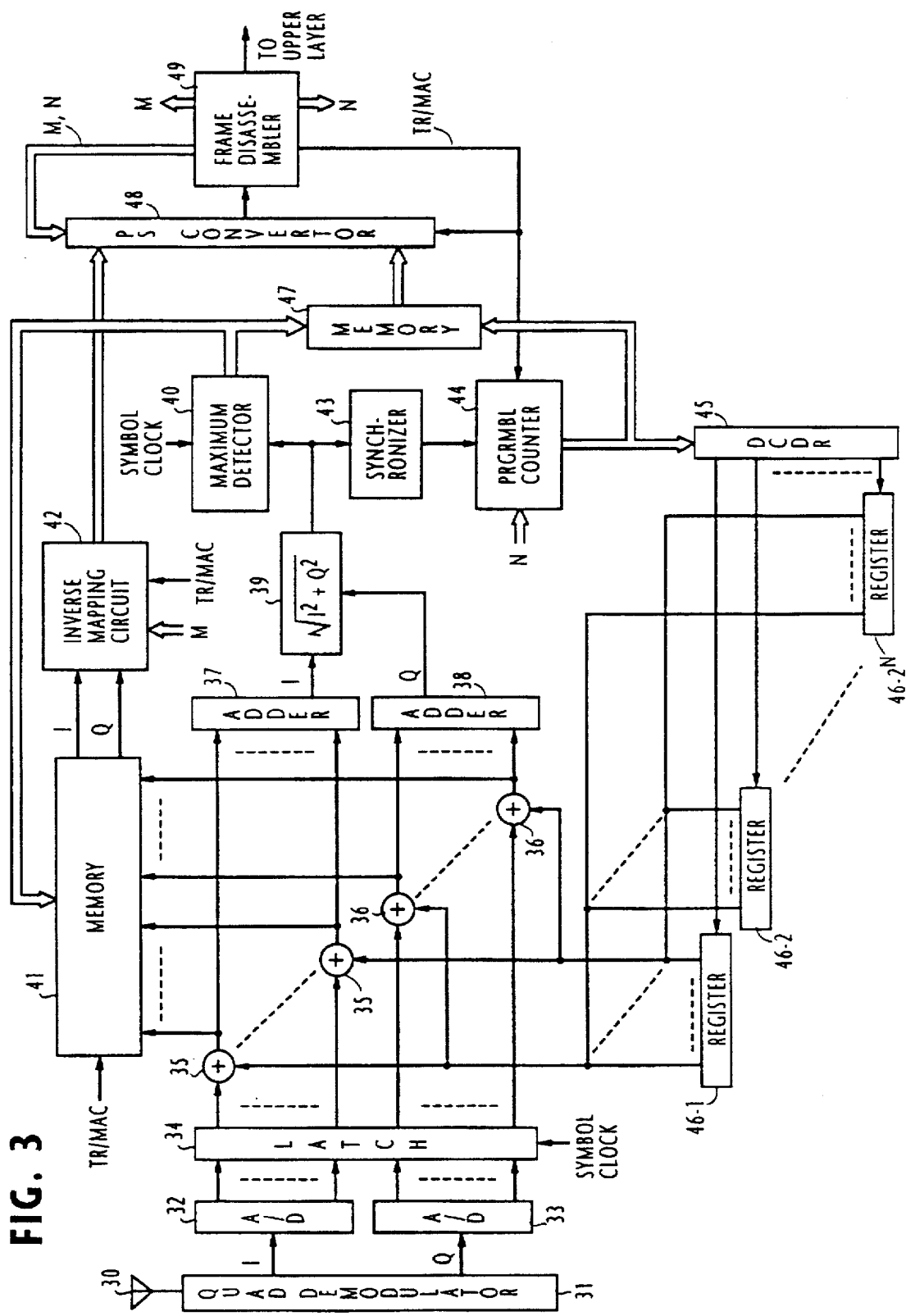
FIG. 3 is a block diagram of a variable mode spread spectrum receiver according to the present invention.

In FIG. 3, the spread spectrum, variable-phase PSK receiver of the present invention includes a quadrature demodulator 31 for demodulating a spread spectrum PSK signal detected by antenna 30, using quadrature carriers, to produce baseband I and Q channel signals. These I and Q signals are converted to corresponding digital signals by A/D converters 32 and 33 and stored in a latch 34 which is cleared at symbol clock intervals. The receiver includes a first group of modulo-2 adders 35 connected to latch 34 to receive the scrambled data bits of the I-channel signal and a second group of modulo-2 adders 36 are connected to latch 34 to receive the scrambled data bits of the Q-channel signal. Since the receiver is unaware of the actual value of the N-bit portion of each transmitted symbol, $2^N$ pseudorandom sequences which are specified by the integer N in the header are sequentially supplied from a plurality of registers 46-1 to 46-$2^N$ to the modulo-2 adders 35 to 36 to descramble, or "despread" the I- and Q-channel data bits. Registers 46-1 through 46-$2^N$ shore to same PN sequences as those generated by PN generators 20-1 through 20-$2^N$, respectively.

In order to determine which of the PN sequences yields the highest correlation for a given symbol interval, the outputs of modulo-2 adders 35 are summed together in an adder 37 and those of modulo-2 adders 36 are summed together in an adder 38. The outputs of adders 37 and 38 are applied to an amplitude detector, or correlation detector 39 where the correlations between PN sequences used in the given symbol interval and the received signals are determined by squaring the I and Q inputs, summing the squared values and finding a square root of the sum. The output of correlation detector 39 is supplied to a maximum detector 40 which includes a latch and a comparator. By using the latch and comparator, the maximum detector 40 successively stores a correlation value from the correlator detector 39 and compares it with the next value and determines which of the correlation values is highest. Maximum detector 40 may use a counter, which is rest at symbol intervals, to produce a count that identifies the highest correlation value, and hence the I- and Q-channel data bits despread by the PN sequence that produced the highest correlation.

The despread I- and Q-channel data bits successively produced during each symbol interval are supplied tin parallel and stored in a memory 41 and those of the stored data bits identified by the output of maximum detector 40 are read out of the memory 41 in serial form into an inverse mapping circuit 42. Inverse mapping circuit 42 converts the outputs of memory 41 into an M-bit signal according to the integer M contained in the header of a received frame in a manner inverse to that of the mapping circuit 13 at the transmitter. The M-bit output of inverse mapping circuit 42 represents the M-bit code of a transmitted symbol.

A synchronizer 43 is connected to the output of correlation detector 39. Synchronizer 43 produces a timing pulse in response to the detection of each correlation and drives a programmable counter 44. Programmable counter 44 is preset to the integer N detected by a frame disassembler 49 to increment a modulo-$2^N$ count value representing the identity of each of the PN sequences used during a symbol interval, and hence the identity of a set of despread I and Q signals stored in memory 41. The modulo-$2^N$ count value is supplied as an N-bit signal to a decoder 45 where it is decoded to produce an output that selectively activates one of the PN sequence registers 46. A memory 47 is provided for storing the N-bit signal. The output of maximum detector 40 is used to read one of the N-bit signals from memory 47 that corresponds to the PN sequence that results in the highest correlation. This N-bit signal, now read out of memory 47, represents the N-bit portion of the transmitted symbol.

The M- and N-bit data are supplied to a parallel-to-serial converter 48, where they are converted to serial form and supplied to the frame disassembler 49 where the training sequence in the header is used for synchronization and the integers M and N are detected, and symbol bits in the frame are disassembled for network identity and signal processing.

During the time a header is being received, frame disassembler 49 supplies a low level signal through TR/MAC lead to the programmable counter 44. In response, counter 44 is conditioned to produce an all-zero bit signal that causes decoder 45 to activate register 46-1 which stores the same PN sequence as that used for spreading the header information at the transmitter. Therefore, the header information is despread by a predetermined PN sequence produced by register 46-1 and stored in memory 41. During the header period, memory 41 is conditioned to read all the stored data bits into inverse mapping circuit 42. This inverse mapping circuit is also set in the 2 PSK mode predetermined for the header period to recover the header information. According to the integers M and N contained in the header, frame disassembler 49 sets the inverse mapping circuit 42 in a mode specified by the integer M contained in the header, sets the parallel-to-serial converter 48 in a state that converts the (M+N) parallel bits into serial data according to the integers M, N, and presets the programmable counter 44 to produce the modulo-$2^N$ count.

Following the reception of a header, the receiver is ready to accept the MAC frame. If the header indicates that M=2 and N=1 (i.e., three data bits per symbol), programmable counter 44 is preset to provide a sequence of binary count outputs "00" and "01" in response to timing signals from synchronizer 43. The outputs of counter 44 are translated by decoder 45 and registers 46-1 and 36-2 are sequentially activated during a symbol interval. Using the PN sequences provided by registers 46-1 and 46-2, the scrambled data bits of a given symbol are despread and stored in memory 41 and correlations are taken by correlation detector 39. One of the correlation values having a higher value is detected by maximum detector 40 and its identity determined. The identity signal from maximum detector 40 is used by memory 41 to read the data bits that are correctly descrambled into inverse mapping circuit 42 and used by memory 47 to read the N-bit output of programmable counter 44 into the parallel-to-serial converter 48. The descrambled data bits are converted to the original M-bit data and supplied to the parallel-to-serial converter 48. According to the integers M=2 and N=1 supplied from frame disassembler 49, parallel-to-serial converter 48 recovers original three data bits for each symbol.

Mention has been made of an embodiment in which the transmit site of the network informs the receive site of the integer N to indicate the number of different pseudorandom sequences to be used for each frame and the receiver searches through the informed PN sequences to determine which one was actually used. The use of the programmable counter is to limit the number of such different PN sequences to be searched. However, the present invention could be simplified in such a form that the integer N is not transmitted and a modulo-$2^N$ counter is used, instead of the programmable counter. In such modifications, both sites of the network agree to a maximum number of N bits, and $2^N$ pseudorandom sequences are always used at the receiver for each symbol to search for the actually used PN sequence, although some of these PN sequences may not be used for certain symbols.

What is claimed is:

1. A spread spectrum transmitter comprising:

framing means for producing a header containing symbol bits indicating an integer M, and assembling symbol bits to form a frame, where M is equal to or greater than 1;

separator means for separating (M+N) symbol bits of said frame into an M-bit portion and an N-bit portion of a frame, respectively, where N is equal to or greater than 0;

a quadrature mapping circuit, connected to receive said header and said M-bit portion of said symbol from said separator means, for converting said header into in-phase (I) and quadrature (Q) signals having a predetermined number of signal points in a signal constellation and converting the M-bit portion of said symbol into I and Q signals having $2^M$ signal points in said signal constellation;

pseudorandom sequence generator means for producing a predetermined pseudorandom sequence when said header is being produced by said framing means and selectively producing one of $2^N$ pseudorandom sequences of unique bit patterns depending on the value of value of said N-bit portion of said frame;

spreading means for spreading said I and Q signals of said header with said predetermined pseudorandom sequence and spreading said I and Q signals of said frame with said one of the $2^N$ pseudorandom sequences; and transmitter means for quadrature modulating and transmitting the spread I and Q signals of said header and said frame.

2. A spread spectrum transmitter comprising:

framing means for producing a header containing symbol bits indicating integers M and N, and assembling symbol bits to form a frame, where M is equal to or greater than 1 and N is equal to or greater than 0;

separator means for separating symbol bits of said frame into an M-bit portion and an N-bit portion of a frame according to said integers M and N, respectively;

a quadrature mapping circuit, connected to receive said header and said M-bit portion of said frame from said separator means, for converting said header into in-phase (I) and quadrature (Q) signals having a predetermined number of signal points in a signal constellation and converting the M-bit portion of said frame into I and Q signals having $2^M$ signal points in said signal constellation;

pseudorandom sequence generator means for producing a predetermined pseudorandom sequence when said header is being produced by said framing means and selectively producing one of $2^N$ pseudorandom sequences of unique bit patters depending on the value of value of said N-bit portion of said frame;

spreading means for spreading said I and Q signals of said header with said predetermined pseudorandom sequence and spreading said I and Q signals of said frame with said one of $2^N$ pseudorandom sequences; and transmitter means for quadrature modulating and transmitting the spread I and Q signals of said header and said frame.

3. A spread spectrum receiver comprising:

receiver means for receiving quadrature-modulated spread spectrum signals containing a header having an integer M and a frame having symbol bits, and converting said header and said frame to in-phase (I) and quadrature (Q) signals, where M is equal to or greater than 1;

pseudorandom sequence generator means for producing a predetermined pseudorandom sequence when said header is being received by said converter means, said pseudorandom sequence generator means being capable of sequentially producing $2^N$ pseudorandom sequences of unique bit patterns when said frame is being received by said converter means, where N is equal to or greater than 0;

despreading means for despreading the I and Q signals of said header with said predetermined pseudorandom sequence and despreading the I and Q signals of said frame with said sequentially produced pseudorandom sequences;

means for detecting the integer M from the despread header;

maximum detector means, connected to receive the despread I and Q signals from the despreading means, for detecting correlations between said I and Q signals and said $2^N$ pseudorandom sequences and detecting a maximum value of the correlations for each symbol;

modulo-$2^N$ counter means for incrementing a modulo-$2^N$ count value in response to each of said correlations to produce a series of modulo-$2^N$ count values, causing said pseudorandom sequence generator means to produce said $2^N$ pseudorandom sequences according to the modulo-$2^N$ count values, and selecting one of said count values corresponding to the correlation having said maximum value to produce N-bit data representing the selected count value;

a memory for storing the despread I and Q signals produced by said despreading means for each symbol and reading stored I and Q signals identified by the N-bit data;

an inverse quadrature mapping circuit for converting the I and Q signals read out of said memory into M-bit data according to the detected integer M; and combiner means for combining the M-bit data and the N-bit data into a serial form.

4. A spread spectrum receiver as claimed in claim 3, wherein said despreading means comprises:

latch means for storing symbol bits of the I and Q signals from said receiver means;

a first group of modulo-2 adders for despreading the symbol bits of the I signal stored in the latch means with respective bits of the pseudorandom sequence sequentially produced by said pseudorandom sequence generator means; and a second group of modulo-2 adders for despreading the symbol bits of the Q signal stored in the latch means with respective bits of the pseudorandom sequence selectively produced by said pseudorandom sequence generator means.

5. A spread spectrum receiver as claimed in claim 4, wherein said maximum detector means comprises:

a first adder for summing outputs of the modulo-2 adders of said first group;

a second adder for summing outputs of the modulo-2 adders of said second group;

amplitude detector means for combining outputs of said first and second adders and detecting a total power value of the combined outputs; and means for detecting a total power value having the highest of the total power values produced for each symbol.

6. A spread spectrum receiver comprising:

receiver means for receiving spread spectrum signals containing a header having integers M and N, and a frame having symbol bits, and converting said header and said frame to in-phase (I) and quadrature (Q) signals, where M is equal to or greater than 1 and N is equal to or greater than 0;

pseudorandom sequence generator means for producing a predetermined pseudorandom sequence when said header is being received by said converter means, said pseudorandom sequence generator means being capable of sequentially producing $2^N$ pseudorandom sequences of unique bit patterns when said frame is being received by said converter means;

despreading means for despreading the I and Q signals of said header with said predetermined pseudorandom sequence, and despreading the I and Q signals of said frame with said sequentially produced pseudorandom sequences;

means for detecting the integers M and N from the despread header;

maximum detector means, connected to receive the despread I and Q signals from the despreading means, for detecting correlations between said I and Q signals and said $2^N$ pseudorandom sequences and detecting a maximum value of the correlations for each symbol;

programmable counter means presettable to the detected integer N for incrementing a modulo-$2^N$ count value in response to each of said correlations to produce a series of modulo-$2^N$ count values, causing said pseudorandom sequence generator means to produce said $2^N$ pseudorandom sequences according to the modulo-$2^N$ count values, and selecting one of said count values corresponding to the correlation having said maximum value to produce N-bit data representing the selected count value;

a memory for storing the despread I and Q signals produced by said despreading means for each symbol and reading stored I and Q signals identified by the N-bit data;

an inverse quadrature mapping circuit for converting the I and Q signals read out of said memory into M-bit data according to the detected integer M; and combiner means for combining the M-bit data and the N-bit data into a serial form.

7. A spread spectrum receiver as claimed in claim 6, wherein said despreading means comprises:

latch means for storing symbol bits of the I and Q signals from said receiver means;

a first group of modulo-2 adders for despreading the symbol bits of the I signal stored in the latch means with respective bits of the pseudorandom sequence sequentially produced by said pseudorandom sequence generator means; and a second group of modulo-2 adders for despreading the symbol bits of the Q signal stored in the latch means with respective bits of the pseudorandom sequence selectively produced by said pseudorandom sequence generator means.

8. A spread spectrum receiver as claimed in claim 7, wherein said maximum detector means comprises:

a first adder for summing outputs of the modulo-2 adders of said first group;

a second adder for summing outputs of the modulo-2 adders of said second group;

amplitude detector means for combining outputs of said first and second adders and detecting a total power value of the combined outputs; and means for detecting a total power value having the highest of the total power values produced for each symbol.

9. A spread spectrum communication system comprising:

framing means for producing a header containing an integer M, and assembling symbol bits to form a frame, where M is equal to or greater than 1;

separator means for separating (M+N) data bits of a symbol in said frame into an M-bit portion and an N-bit portion, where N is equal to or greater than 0;

a quadrature mapping circuit, connected to receive said header and said M-bit portion of said symbol from said separator means, for converting said header into in-phase (I) and quadrature (Q) signals having a predetermined number of signal points in a signal constellation and converting the M-bit portion of said symbol into I and Q signals having $2^M$ signal points in said signal constellation;

first pseudorandom sequence generator means, connected to receive said N-bit portion of the symbol from said separator means, for producing a predetermined pseudorandom sequence when said header is being produced by said framing means and selectively producing one of $2^N$ pseudorandom sequences of unique bit patterns according to said N-bit portion of a symbol in said frame when said symbol is being assembled by said framing means;

spreading means for spreading said I and Q signals of said header with said predetermined pseudorandom sequence and spreading said I and Q signals of said frame with said selectively produced pseudorandom sequence;

transmitter means for quadrature modulating and transmitting the spread I and Q signals of said header and said frame;

receiver means for receiving and quadrature demodulating the transmitted signals to receiver I and Q signals of said header and said frame;

second pseudorandom sequence generator means for producing a predetermined pseudorandom sequence when said header is being received by said receiver means, said second pseudorandom sequence generator means being capable of sequentially producing $2^N$ pseudorandom sequences of unique bit patterns when said frame is being received by said converter means;

despreading means connected to said receiver means and said second pseudorandom sequence generator means for despreading the recovered I and Q signals of said header with said predetermined pseudorandom sequence, and despreading the recovered I and Q signals of said frame with said sequentially produced pseudorandom sequences;

means for detecting the integer M from the despread header;

maximum detector means, connected to receive the despread I and Q signals from the despreading means, for detecting correlations between said I and Q signals and said $2^N$ pseudorandom sequences and detecting a maximum value of the correlations for each symbol;

modulo-$2^N$ counter means for incrementing a modulo-$2^N$ count value in response to each of said correlations to produce a series of modulo-$2^N$ count values, causing said second pseudorandom sequence generator means to produce said $2^N$ pseudorandom sequences according to the modulo-$2^N$ count values, and selecting one of said count values corresponding to the correlation having said maximum value to produce N-bit data representing the selected count value;

a memory for storing the despread I and Q signals produced by said despreading means for each symbol and reading stored I and Q signals identified by the N-bit data;

an inverse quadrature mapping circuit for converting the I and Q signals read out of said memory into M-bit data according to the detected integer M; and combiner means for combining the M-bit data and the N-bit data into a serial form.

10. A spread spectrum communication system as claimed in claim 9, wherein said despreading means comprises:

latch means for storing symbol bits of the I and Q signals from said receiver means;

a first group of modulo-2 adders for despreading the symbol bits of the I signal stored in the latch means with respective bits of said sequentially produced $2^N$ pseudorandom sequences; and a second group of modulo-2 adders for despreading the symbol bits of the Q signal stored in the latch means with respective bits of said sequentially produced $2^N$ pseudorandom sequences.

11. A spread spectrum communication system as claimed in claim 10, wherein said maximum detector means comprises:

a first adder for summing outputs of the modulo-2 adders of said first group;

a second adder for summing outputs of the modulo-2 adders of said second group;

amplitude detector means for combining outputs of said first and second adders and detecting a total power value of the combined outputs; and means for detecting a total power value having the highest of the total power values produced for each symbol.

12. A spread spectrum communication system comprising:

framing means for producing a header containing integers M and N, and assembling symbol bits to form a frame, where M is equal to or greater than 1 and N is equal to or greater than 0;

separator means for separating (M+N) data bits of a symbol in said frame into an M-bit portion and an N-bit portion;

a quadrature mapping circuit, connected to receive said header and said M-bit portion of said symbol from said separator means, for converting said header into in-phase (I) and quadrature (Q) signals having a predetermined number of signal points in a signal constellation and converting the M-bit portion of said symbol into I and Q signals having $2^M$ signal points in said signal constellation;

first pseudorandom sequence generator means, connected to receive said N-bit portion of the symbol from said separator means, for producing a predetermined pseudorandom sequence when said header is being produced by said framing means and selectively producing one of $2^N$ pseudorandom sequences of unique bit patterns according to said N-bit portion of a symbol in said frame when said symbol is being assembled by said framing means;

spreading means for spreading said I and Q signals of said header with said predetermined pseudorandom sequence and spreading said I and Q signals of said frame with said selectively produced pseudorandom sequence;

transmitter means for quadrature modulating and transmitting the spread I and Q signals of said header and said frame;

receiver means for receiving and quadrature demodulating the transmitted signals to recover I and Q signals of said header and said frame;

second pseudorandom sequence generator means for producing a predetermined pseudorandom sequence when said header is being received by said receiver means, said second pseudorandom sequence generator means being capable of sequentially producing $2^N$ pseudorandom sequences of unique bit patterns when said frame is being received by said converter means;

despreading means connected to said receiver means and said second pseudorandom sequence generator means for despreading the recovered I and Q signals of said header with said predetermined pseudorandom sequence and despreading the recovered I and Q signals of said frame with said sequentially produced pseudorandom sequences;

means for detecting the integers M and N from the despread header;

maximum detector means, connected to receive the despread I and Q signals from the despreading means, for detecting correlations between said I and Q signals and said $2^N$ pseudorandom sequences and detecting a maximum value of the correlations for each symbol;

programmable counter means presettable to the detected integer N for incrementing a modulo-$2^N$ count value in response to each of said correlations to produce a series of modulo-$2^N$ count values, causing said second pseudorandom sequence generator means to produce said $2^N$ pseudorandom sequences according to the modulo-$2^N$ count values, and selecting one of said count values corresponding to the correlation having said maximum value to produce N-bit data representing the selected count value;

a memory for storing the despread I and Q signals produced by said despreading means for each symbol and reading stored I and Q signals identified by the N-bit data;

an inverse quadrature mapping circuit for converting the I and Q signals read out of said memory into M-bit data according to the detected integer M; and combiner means for combining the M-bit data and the N-bit data inter a serial form.

13. A spread spectrum communication system as claimed in claim 12, wherein said despreading means comprises:

latch means for storing symbol bits of the I and Q signals from said receiver means;

a first group of modulo-2 adders for despreading the symbol bits of the I signal stored in the latch means with respective bits of said sequentially produced $2^N$ pseudorandom sequences; and a second group of modulo-2 adders for despreading the symbol bits of the Q signal stored in the latch means with respective bits of said sequentially produced $2^N$ pseudorandom sequences.

14. A spread spectrum communication system as claimed in claim 13, wherein said maximum detector means comprises:

a first adder for summing outputs of the modulo-2 adders of said first group;

a second adder for summing outputs of the modulo-2 adders of said second group;

amplitude detector means for combining outputs of said first and second adders and detecting a total power value of the combined outputs; and means for detecting a total power value having the highest of the total power values produced for each symbol.

15. A communication method comprising the steps of:

a) producing a header containing an integer M, where M is equal to or greater than 1;

b) converting said header into in-phase (I) and quadrature (Q) signals having a predetermined number of signal points in a signal constellation;

c) spreading said I and Q signals of said header with a predetermined pseudorandom sequences;

d) converting the spread I and Q signals of said header into a combined signal and transmitting the combined signal;

e) assembling symbol bits to form a frame;

f) separating (M+N) symbol bits in said frame into an M-bit portion and an N-bit portion of a symbol, where N is equal to or greater than 0;

g) converting the M-bit portion of said symbol into I and Q signals having $2^M$ signal points in said signal constellation;

h) spreading the I and Q signals of said frame with one of $2^N$ pseudorandom sequences of unique bit patterns depending on the value of said N-bit portion of each symbol in said frame; and i) converting the spread I and Q signals of said frame into a combined signal and transmitting the combined signal.

16. A communication method as claimed in claim 15, further comprising the steps of:

h) receiving the transmitted signal of the header and converting the received signal to received I and Q signals;

i) despreading the received I and Q signals of said header with said predetermined pseudorandom sequence and detecting said integer M;

j) receiving the transmitted signal of said frame and converting the received signal to received I and Q signals;

k) sequentially producing $2^N$ pseudorandom sequences;

l) sequentially despreading the received I and Q signals of step (j) with the pseudorandom sequences produced by step (k) and storing the despread I and Q signals of the frame in a memory;

m) detecting correlations between the received I and Q signals of step (j) and the pseudorandom sequences produced by step (k) and detecting a maximum value of the correlations for each symbol;

n) incrementing a modulo-$2^N$ counter in response to each of said correlations to produce a series of modulo-$2^N$ count values and selecting one of said count values corresponding to the correlation having said maximum value to produce N-bit data representing the selected count value;

o) reading from the memory stored despread I and Q signals identified by the N-bit data;

p) converting the I and Q signals read out of said memory into M-bit data according to the detected integer M; and q) combining the M-bit data and the N-bit data into a serial form.

17. A communication method comprising the steps of:

a) producing a header containing integers M and N, where M is equal to or greater than 1 and N is equal to or greater than 0;

b) converting said header into in-phase (I) and quadrature (Q) signals having a predetermined number of signal points in a signal constellation;

c) spreading said I and Q signals of said header with a predetermined pseudorandom sequence;

d) converting the spread I and Q signals of said header into a combined signal and transmitting the combined signal;

e) assembling symbol bits to form a frame;

f) separating (M+N) symbol bits in said frame into an M-bit portion and an N-bit portion;

g) converting the M-bit portion of said frame into I and Q signals having $2^M$ signal points in said signal constellation;

h) spreading the I and Q signals of said frame with one of $2^N$ pseudorandom sequences of unique bit patterns depending on the value of said N-bit portion of said frame; and i) quadrature modulating and transmitting the spread I and Q signals of said frame.

18. A communication method as claimed in claim 17, further comprising the steps of:

h) receiving and quadrature demodulating the transmitted I and Q signals of the header;

i) despreading the received I and Q signals of said header with said predetermined pseudorandom sequence and detecting said integers M and N;

j) receiving and quadrature demodulating the transmitted signal I and Q signals of said frame;

k) sequentially producing $2^N$ pseudorandom sequences according to the detected integer N;

l) sequentially despreading the received I and Q signals of step (j) with the pseudorandom sequences produced by step (k) and storing the despread I and Q signals of the frame in a memory;

m) detecting correlations between the received I and Q signals of step (j) and the pseudorandom sequences produced by step (k) and detecting a maximum value of the correlations for each symbol;

n) setting a programmable counter to the detected integer N to produce a modulo-$2^N$ count value and incrementing the counter in response to each of said correlations to produce a series of modulo-$2^N$ count values and selecting one of said count values corresponding to the correlation having said maximum value to produce N-bit data representing the selected count value;

o) reading from the memory stored despread I and Q signals from the memory identified by the N-bit data;

p) converting the I and Q signals read out of said memory into M-bit data according to the detected integer M; and q) combining the M-bit data and the N-bit data into a serial form.

\* \* \* \* \*